No. 893,669. PATENTED JULY 21, 1908.
J. STEEL.
COUPON CUTTING SHEARS.
APPLICATION FILED JULY 11, 1906. RENEWED DEC. 17, 1907.
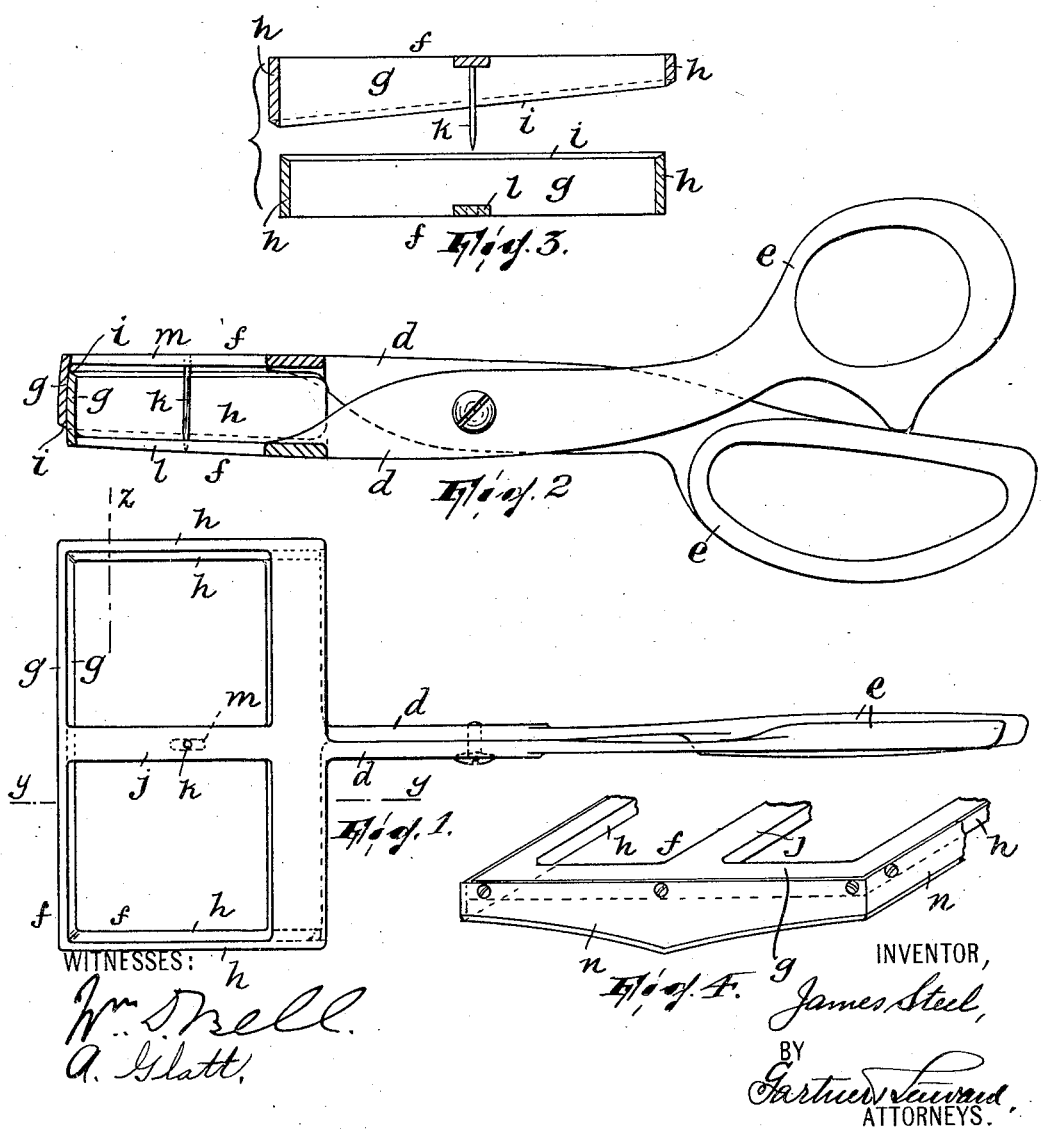
WITNESSES:
Wm. S. Bell.
A. Glatt.
INVENTOR,
James Steel,
BY
Gartner & Seward,
ATTORNEYS.

UNITED STATES PATENT OFFICE.

JAMES STEEL, OF LITTLE FALLS, NEW JERSEY, ASSIGNOR TO HEKTOGRAPH CO., A CORPORATION OF NEW JERSEY.

COUPON-CUTTING SHEARS.

No. 893,669.  Specification of Letters Patent.  Patented July 21, 1908.

Application filed July 11, 1906, Serial No. 325,633. Renewed December 17, 1907. Serial No. 406,898.

*To all whom it may concern:*

Be it known that I, JAMES STEEL, a citizen of the United States, residing in Little Falls, county of Passaic, State of New Jersey, have invented certain new and useful Improvements in Coupon-Cutting Shears; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention is an improvement in shears or scissors, and it has for its object to provide an implement of this kind convenient especially for cutting coupons and in other instances where an angular cut is to be made.

My invention will be found fully illustrated in the accompanying drawings, wherein, Figure 1 is a plan view of one form of my invention; Fig. 2 is a view in section on the line $y$—$y$ in Fig. 1; Fig. 3 is a sectional view on the line $z$ in Fig. 1; and, Fig. 4 illustrates a modification of the form of my invention shown in Figs. 1, 2 and 3.

Referring now to Figs. 1, 2 and 3 each shank $d$ of the shears or scissors, having a handle $e$, is formed with a rectangular frame $f$. Each frame has the side $g$ thereof which is the farther from the handle $e$ and the two sides $h$ adjoining the same each arranged in a vertical plane. The one frame $f$ fits snugly within the other, so that the corresponding sides $g$ and $h$ wipe against each other, and said sides have their top and bottom edges ground off in a bevel, as shown at $i$ in Fig. 2, to produce cutting edges. The edges $i$ of the sides $h$ of course operate on each other at an angle the same as in any ordinary shears; in order to secure the same effect with respect to the edges $i$ of the sides $g$, one of said edges is disposed obliquely, as shown in Fig. 3.

In order to prevent the paper or other fragments cut away being scattered about, it is proposed to provide means for temporarily holding them on the shears until a number have been collected, whereupon they may be thrown away. To this end one of the frames $f$ comprises a cross-piece $j$ carrying a vertical pin $k$ projecting toward a similar cross-piece $l$ in the other frame $f$, which cross-piece $l$ may have an opening $m$ to receive said pin. Thus, as fast as the coupons or other fragments are cut away, they are perforated by and received on to the pin $k$. The sides $g$, $h$ and $h$, being arranged vertically as above described, form in the frame which carries pin $k$ a receptacle in which the coupons are collected. I do not, therefore, wish to be limited to the employment of said pin, since the effect of collecting and holding the coupons may be accomplished without it, although not so well in that case.

In Fig. 4 the cutting portions proper are separate blades $n$ which may be riveted or otherwise secured to the sides $h$ and $g$ of the frame. In lieu of forming one of them with its edge oblique, as in Fig. 3, its edge may have an angular formation, as shown, the start of the cut being formed by the point or apex of the angle.

Having thus fully described my invention, what I claim as new and desire to secure by Letters Patent is:

1. A pair of scissors or shears having frames in their acting portions, the frame having three angularly disposed vertical and adjoining sides forming together a receptacle and having their corresponding edges formed as cutting edges, and the other frame having cutting edges arranged to coöperate with the said first-named cutting edges, substantially as described.

2. A pair of scissors or shears having frames in their acting portions, the frame having three angularly disposed vertical and adjoining sides forming together a receptacle and having their corresponding edges formed as cutting edges, and the other frame having cutting edges arranged to coöperate with the said first-named cutting edges, in combination with a vertically disposed pin carried by said first-named frame, substantially as described.

In testimony, that I claim the foregoing, I have hereunto set my hand this 11th day of June, 1906.

JAMES STEEL.

Witnesses:
JOHN W. STEWARD,
WM. D. BELL.